(12) United States Patent
Hann

(10) Patent No.: US 7,042,901 B1
(45) Date of Patent: May 9, 2006

(54) METHOD AND SYSTEM FOR PROCESSING DATA IN A SERVER

(75) Inventor: William P. Hann, Round Rock, TX (US)

(73) Assignee: Cisco Technology, Inc., San Jose, CA (US)

(*) Notice: Subject to any disclaimer, the term of this patent is extended or adjusted under 35 U.S.C. 154(b) by 939 days.

(21) Appl. No.: 10/105,739

(22) Filed: Mar. 20, 2002

(51) Int. Cl.
*H04L 12/66* (2006.01)

(52) U.S. Cl. .................................... 370/463; 370/395.1

(58) Field of Classification Search ........ 370/351–356, 370/463, 395.1, 419, 420, 421, 465; 375/219, 375/222
See application file for complete search history.

(56) References Cited

U.S. PATENT DOCUMENTS

| | | | |
|---|---|---|---|
| 6,640,239 B1* | 10/2003 | Gidwani | 709/203 |
| 6,697,768 B1* | 2/2004 | Jones et al. | 702/189 |
| 6,970,415 B1* | 11/2005 | Galarza et al. | 370/201 |
| 2002/0169585 A1* | 11/2002 | Jones et al. | 702/189 |
| 2003/0123476 A1* | 7/2003 | Shenoi | 370/458 |

* cited by examiner

*Primary Examiner*—Ajit Patel
(74) *Attorney, Agent, or Firm*—Baker Botts L.L.P.

(57) ABSTRACT

According to one embodiment of the invention, a method for managing cells in a digital subscriber line access multiplexer is provided. The method includes providing a plurality of buffers, where each one of the plurality of buffers is operable to communicate with a particular one of line cards. The method also includes providing a timing signal controller. The timing signal controller is operable to transmit one or more signals to each one of the line cards. Each signals is a command to send a data cell. The method also includes transmitting a set of the signals to the line cards. Each signal of the set is directed to a unique one of the line cards. The signals in the set are staggered from each other by a respective time interval. The method also includes receiving, at each buffer, the data cell from the respective line card that is associated with the buffer, in response to transmitting the set of signals.

50 Claims, 4 Drawing Sheets

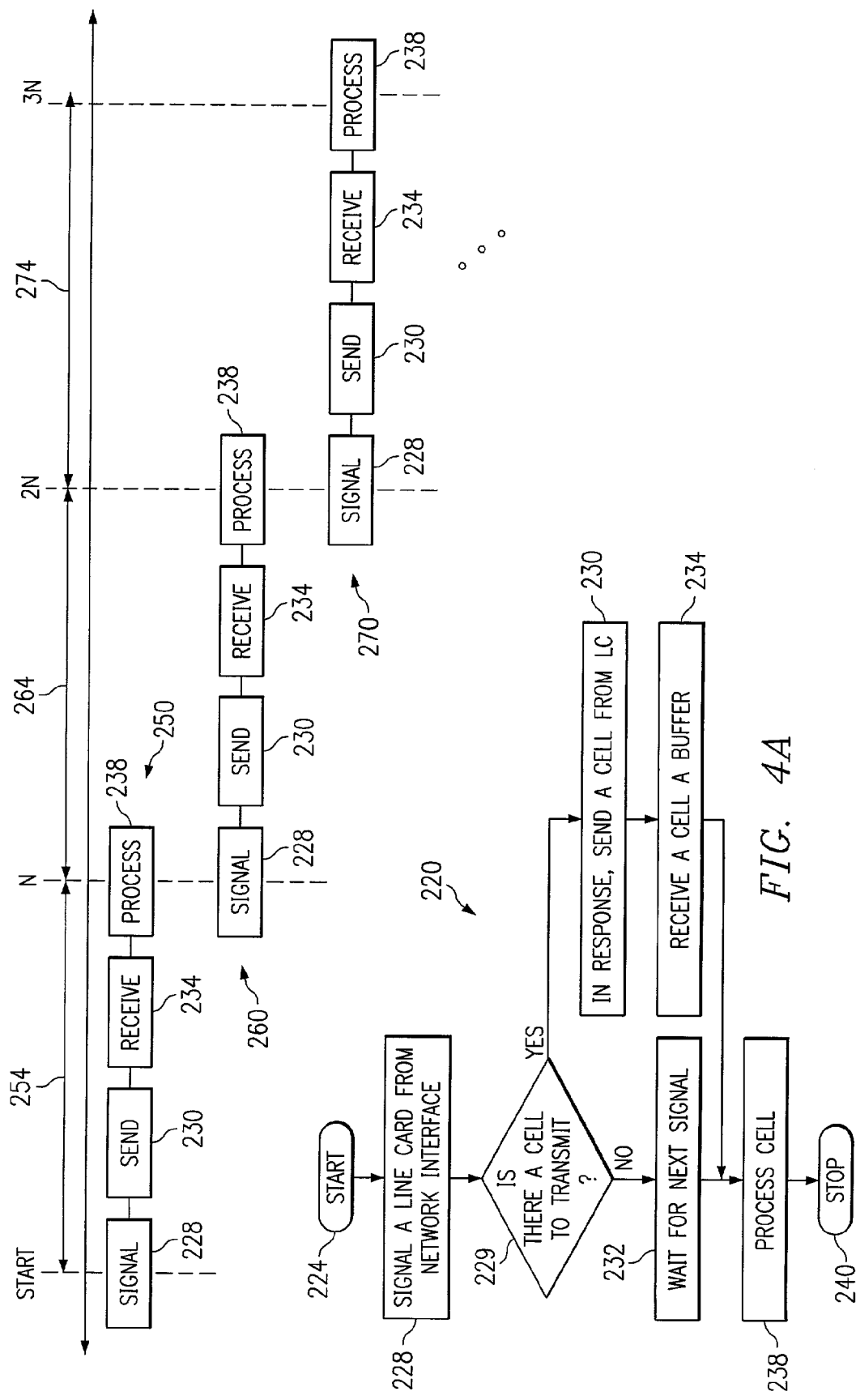

METHOD AND SYSTEM FOR PROCESSING DATA IN A SERVER

TECHNICAL FIELD OF THE INVENTION

This invention relates generally to communications and more particularly to method and system for processing data in a server.

BACKGROUND OF THE INVENTION

A communication server provides access to communication facilities. For example, a communication server having a bank of modems may provide subscriber access to the modems for data communication. A communication server may be associated with its own dedicated communication network, or with an existing communication network, such as the public switched telephone network (PSTN).

As communication networks provide greater connectivity and access to information, there is an increasing demand for data communication at higher rates. One solution to providing increased data rates is adopting improved communication techniques using the existing hardware infrastructure. For example, digital subscriber line (DSL) technology provides faster data service over existing twisted pair wiring.

Implementation of DSL technology requires a communication server that may operate as an interface between the individual DSL subscribers and the Internet Protocol (IP) network. However, processing many bundles of data from numerous DSL subscribers sometimes results in overflow of data at internal buffers of the communication server. The existing solutions to this problem require the use of larger buffers and/or faster processors, which increase the cost of manufacturing communication servers.

SUMMARY OF THE INVENTION

According to one embodiment of the invention, a method for managing cells in a digital subscriber line access multiplexer is provided. The method includes providing a plurality of buffers, where each one of the plurality of buffers is operable to communicate with a particular one of line cards. The method also includes providing a timing signal controller. The timing signal controller is operable to transmit one or more signals to each one of the line cards. Each signals is a command to send a data cell. The method also includes transmitting a set of the signals to the line cards. Each signal of the set is directed to a unique one of the line cards. The signals in the set are staggered from each other by a respective time interval. The method also includes receiving, at each buffer, the data cell from the respective line card that is associated with the buffer, in response to transmitting the set of signals.

According to another embodiment of the invention, a system for managing data in a digital subscriber line access multiplexer is provided. The system includes a plurality of buffers. Each buffer is operable to receive a data cell from a respective line card that is associated with the buffer. The system also includes a timing signal controller that is coupled to the plurality of the buffers and their respectively associated line cards. The timing signal controller is operable to transmit a set of signals to the line cards. Each signal of the set is directed to a unique one of the line cards. Each signal of the set is staggered from other signals of the set by a respective time interval.

Some embodiments of the invention provide numerous technical advantages. Some embodiments may benefit from some, none, or all of these advantages. For example, according to one embodiment, the possibility of buffers overflowing with data is reduced without using larger buffers or a complex logic unit in a scheduler. Having smaller buffers and/or a simpler scheduler reduces the overall cost of manufacturing digital subscriber line access multiplexers. Furthermore, having a simpler logic module in a scheduler reduces the possibility of error associated with complex logic units.

Other technical advantages may be readily ascertained by one of skill in the art.

BRIEF DESCRIPTION OF THE DRAWINGS

Reference is now made to the following description taken in conjunction with the accompanying drawings, wherein like reference numbers represent like parts, in which:

FIG. 4A is a flow chart illustrating an embodiment of a method of processing data cells; and FIG. 4B is a time line illustrating an embodiment of implementing the method of processing data cells as shown in FIG. 4A.

DETAILED DESCRIPTION OF EXAMPLE EMBODIMENTS OF THE INVENTION

Embodiments of the invention are best understood by referring to FIGS. 1 through 4B of the drawings, like numerals being used for like and corresponding parts of the various drawings.

Figure 1:
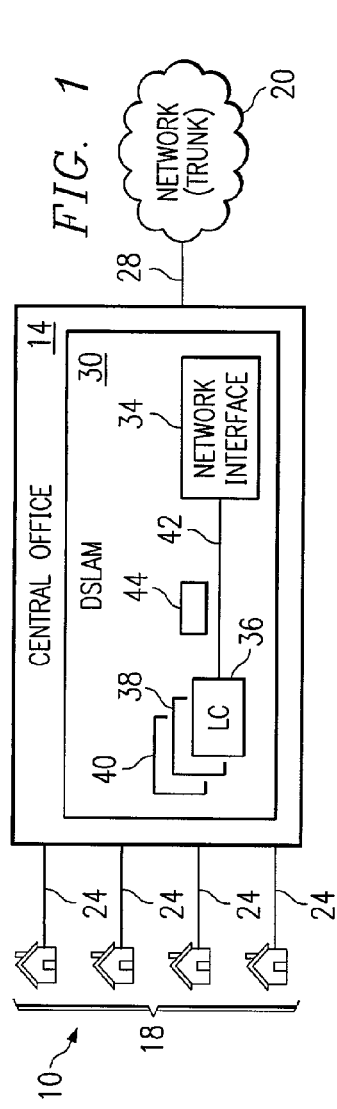
FIG. 1 is a block diagram illustrating an embodiment of a system for processing data cells.

FIG. 1 is a block diagram of a communication system 10 that may benefit from the teachings of the present invention. System 10 includes a central office 14, a plurality of homes or businesses (or other locations) 18 (referred to herein as "customer premises 18") and a network 20, such as an Internet protocol network. Customer premises 18 are coupled to central office 14 by a plurality of lines 24, such as telephone lines. Central office 14 is coupled to network 20 by a trunk line 28. Trunk line 28 may be any suitable communication link that may carry Internet protocol traffic, including OC3, DS3, and T1 (STM 1, E3, E1, in Europe).

Central office 14 comprises, among other components not explicitly shown, a digital subscriber line access multiplexer 30 (referred to herein as "DSLAM 30.") DSLAM 30 comprises, in this example, a network interface card 34, a line card 36, a line card 38, and a line card 40; however, more or less line cards may be utilized. Line cards 36, 38, and 40 are coupled to network interface card 34 by a line 42. Line 42 is operable to carry data 44 between network interface card 34 and line cards 36, 38, and 40. Line 42 may comprise a combination of links, wherein each link couples a particular one of line cards 36, 38, and 40 to network interface card 34.

DSLAM 30 allows communication between customer premises 18 and network 20. In operation, network interface card 34 communicates with network 20 over trunk line 28. Network interface card 34 receives data from network 20 over trunk line 28 and communicates it to a particular one of line cards 36, 38, and 40 that is associated with the intended destination of the data. Conversely, network interface card 34 receives data from line cards 36, 38, and 40 and communicates it over trunk line 28 to network 20. Network interface card 34 also contains the IP/ATM switch fabric (shown and discussed in conjunction with FIG. 2) that manages and processes packets and cells. Network interface card 34 manages all aspects of DSLAM 30, including system help, system performance, switch help and performance, and network communications.

Line cards 36, 38, and 40 receive communication data over telephone lines 24 from customer premises 18 and communicate that information to network interface card 34 for eventual transmission to network 20. Conversely, line cards 36, 38, and 40 receive data through network interface card 34 from network 20 and communicate the data to the appropriate customer premises 18 over line 24. In some embodiments, DSLAM 30 may include more than one network interface card and/or more or less number of line cards than the number shown in FIG. 1.

Figure 2:
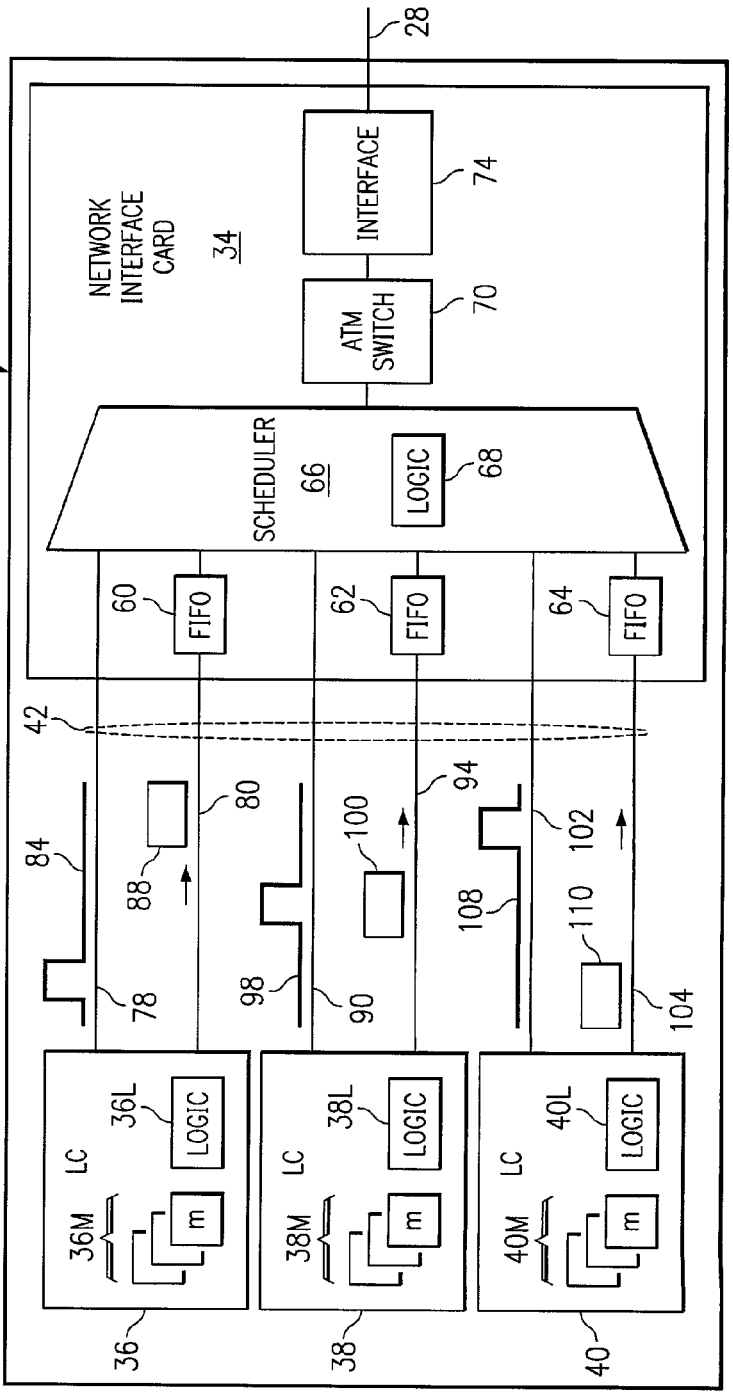
FIG. 2 is a block diagram illustrating an embodiment of a digital subscriber line access multiplexer of the system shown in FIG. 1.

FIG. 2 is a block diagram showing additional details of one embodiment of DSLAM 30 shown in FIG. 1. Portions of the embodiment of DSLAM 30 shown in FIG. 2 are implemented to prevent buffers from overflowing with data, according to the teachings of one embodiment of the invention. In this embodiment, network interface card 34 of DSLAM 30 comprises a buffer 60, a buffer 62, and a buffer 64; however, more, less, or no buffers may be utilized. Buffers 60, 62, and 64 are sometimes referred to as "FIFOs" (first in first out), which is the name of the protocol for chronologically ordering the processing of the data in a buffer. Buffers 60, 62, and 64 are referred to herein as FIFOs 60, 62, and 64. Network interface card 34 also includes a scheduler 66 having a logic module 68, an ATM switch 70, and an interface module 74. Each one of FIFOs 60, 62, and 64 is coupled to scheduler 66. Scheduler 66 is coupled to ATM switch 70, and ATM switch 70 is coupled to interface module 74. As shown in FIG. 2, line card 36 comprises one or more modems 36M. Line card 36 is coupled to FIFO 60 by a link 80. Line cards 38 comprises one or more modems 38M. Line card 38 is coupled to FIFO 62 by a link 94. Line card 40 comprises one or more modems 40M. Line card 40 is coupled to FIFO 64 by a link 104. In one embodiment, links 80, 94, and 104 form line 42, and may be jointly referred to as line 42.

Each one of modems 36M, 38M, and 40M of line cards 36, 38, and 40 respectively is coupled to a particular one of customer premises 18 for sending and receiving data cells. A "data cell" refers to a bundle of data. For example, a data cell in an ATM format includes 53 bytes of data in one bundle. Once one or more data cells are received by line card 36, line card 38, and line card 40, each one of line cards 36, 38, and 40 sends the received data cells to network interface card 34 over links 80, 94, and 104, respectively, so that the data cells may be processed for transmission to network 20. More specifically, line card 36 receives data cells from at least one of customer premises 18 and sends the data cells, one data cell at a time, to FIFO 60 over link 80. FIFO 60 receives the data cells, one after another, from line card 36 and stores the data cells until they can be processed. Similarly, line card 38 receives data cells from at least one of customer premises 18 and sends the data cells, one data cell at a time, to FIFO 62 over link 94. FIFO 62 receives the data cells, one after another, from line card 38 and stores the data cells until they can be processed. Line card 40 receives data cells from at least one of customer premises 18 and sends the data cells, one data cell at a time, to FIFO 64 over link 104. FIFO 64 receives the data cells, one after another, from line card 40 and stores the data cells until they can be processed.

Scheduler 66 schedules, using logic module 68, the transmission of each one of the data cells to ATM switch 70 as the data cells are received and stored at FIFOs 60, 62, and 64 respectively. The data cells are processed by ATM switch 70 and interface module 74 for transmission to network 20. Such processing is often referred to as "servicing" the FIFOs.

As described above, each one of line cards 36, 38, and 40 transmits its respective data cells one data cell at a time over its associated link 80, 94, or 104. Additionally, each one of line cards 36, 38, and 40 transmit its data cells independently of the other line cards 36, 38, and 40. Therefore, at certain times during the transmission of data cells to network interface card 34, a data cell from line card 36, a data cell from line card 38, and a data cell from line card 40 may be received at their respective FIFOs 60, 62, and 64 at the same time. Because FIFOs, such as FIFOs 60, 62, and 64, have relatively limited storage capacity, multiple data cells arriving at FIFOs 60, 62, and 64 may cause one or more of FIFOs 60, 62, and 64 to overflow. Such overflow of one or more FIFOs is referred to as "FIFO overflow."

A conventional solution to reducing the possibility of FIFO overflow is to use a scheduler that is operable to run fast enough so that even if the data cells are received at the same time, FIFO 60, FIFO 62, and FIFO 64 can be scheduled to be serviced before one or more of the FIFOs overflow. However, such a scheduler requires a relatively complex logic unit, which increases the cost of manufacturing DSLAMs. Another conventional solution is to use larger FIFOs to lower the possibility of FIFO overflow. But again, using larger FIFOs increases the cost of manufacturing DSLAM.

According to the teachings of some embodiments of the invention, a method and system are provided that avoid FIFO overflow by staggering the transmission of each data cell to the FIFOs so that data cells do not arrive at the FIFOs simultaneously. In one embodiment, line cards send their respective data cells when signaled by a network interface card that receives the data cells. The network interface card may stagger the arrival of data cells by staggering the transmission of its signals to the line cards. Each signal from the network interface card to a line card indicates a request for the line card to send a data cell to the network interface card. This is advantageous because the possibility of FIFO overflow is reduced without using a larger FIFO or a complex logic unit in a scheduler. In some embodiments, FIFOs may be eliminated by staggering the arrival of data cells. Having smaller or no FIFOs and/or a simpler scheduler lowers the overall cost of manufacturing DSLAMs. Furthermore, having a simpler logic module in a scheduler reduces the possibility of error associated with complex logic units. Additional details of example embodiments of this system and method are described in greater detail below in conjunction with portions of FIG. 2, and FIGS. 3A through 4B.

Referring again to FIG. 2, in one embodiment of the invention, links 78, 90, and 102 are provided to couple respective line cards 36, 38, and 40 to scheduler 66. Scheduler 66 is operable to send one or more signals, where each signal is indicative of a request to receive a data cell at network interface card 34. In one embodiment shown in FIG. 2, lines 80, 94, and 104 couple line cards 36, 38, and 40 to FIFOs 60, 62, and 64 respectively, so that data cells 88, 100, and 110 are sent to FIFOs 60, 62, and 64. However, in other embodiments, lines 80, 94, and 104 may couple line cards 36, 38, and 40 to ATM switch 70 (not explicitly shown). In such embodiments, FIFOs 60, 62, and 64 are not needed. In one embodiment, scheduler 66 may be any timing signal controller that is operable to control the timing of data cell transmission by line cards 36, 38, and 40. The function of scheduler 66 may also be implemented internal to ATM switch 70.

Line card 36 includes a logic unit 36L. Line card 38 includes a logic unit 38L. Line card 40 includes logic unit 40L. In one embodiment, each one of logic units 36L, 38L, and 40L is operable to respond to receiving a signal by triggering one data cell to be sent to the FIFO that is associated with the respective line card. For example, logic unit 36L is operable to trigger line card 36 to send one data cell to FIFO 60 over link 80 in response to receiving a signal over link 78 from scheduler 66. However, line cards 36, 38, and 40 are not required to send data cells in response to receiving their respective signals. Rather, the signals indicate windows of opportunity for line cards 36, 38, and 40 to send their respective data cells.

In one embodiment, scheduler 66 is also operable to send sets of signals to line cards 36, 38, and 40. A signal may be a pulse, in one embodiment, or other suitable indication of a request for transmission. Each set of signals is a collection of a first signal directed to line card 36, a second signal directed to line card 38, and a third signal directed to line card 40. The first, second, and third signals may be staggered by respective time intervals. In one embodiment, the time intervals separating the first, second, and third signals are equal in duration. The determination of the time interval is described below. In another embodiment, scheduler 66 is operable to transmit a string of signals to each one of line cards 36, 38, and 40. A string of signals comprises signals, such as pulses, that are separated from each other by respective time intervals. In one embodiment, the respective time intervals of the signals in a string are equal in duration. Scheduler 66 is operable to shift each one of the strings of signals so that no one signal of a string of signals overlaps in time with another signal of another string of signals.

In operation, scheduler 66 signals line cards 36, 38, and 40 in a pattern that results in the staggering of the transmission of data cells to network interface card 34. For example, in one embodiment shown in FIG. 2, scheduler 66 sends a pulse 84 over link 78, requesting line card 36 to transmit a data cell. After sending pulse 84, scheduler 66 waits for a time interval. Then scheduler 66 sends a pulse 98 over link 90, requesting line card 38 to transmit a data cell. After sending pulse 98, scheduler 66 waits for another time interval. Then scheduler 66 sends a pulse 108 over link 102. After sending pulse 108, scheduler 66 waits for another time interval. Then the process described above starts again with another line card, such as line card 36. In another embodiment, scheduler 66 may send more pulses to any one of line cards 36, 38, and 40 having a higher bandwidth. For example, if line card 36 has twice the bandwidth than those of line card 38 and 40, then scheduler 66 may send two pulses 84 to line card 36 for each one of pulses 98 and 108 sent to line cards 38 and 40 respectively. By inserting a time interval between the transmission of each pulse, the set of pulses transmitted to line cards 36, 38, and 40 are non-synchronous, and thus staggered. One example of the staggering of signals is graphically depicted in FIG. 2. As such, each one of line cards 36, 38, and 40 receive pulses, such as pulses 84, 98, and 108, at different times than each other of line cards 36, 38, and 40.

Because each one of line cards 36, 38, and 40 responds to a pulse by transmitting a data cell (assuming that line cards 36, 38, and 40 have data cells to send), each one of FIFOs 60, 62, and 64 receives the data cells at different times. In one embodiment, the time pattern of data cell transmission by line cards 36, 38, and 40 substantially mirrors the time pattern of pulse transmission by scheduler 66. This result is achieved by the process described below. In one embodiment, in response to receiving pulse 84 at logic 36L, line card 36 transmits a data cell 88 over link 80 to FIFO 60. After line card 36 receives pulse 84, line card 38 receives pulse 98 at logic 38L. And in response, line card 38 transmits a data cell 100 over link 94 to FIFO 62. The transmission of data cell 100 occurs after the transmission of data cell 88 because line card 38 received pulse 98 later in time than when line card 36 received pulse 84. After line card 38 receives pulse 98, line card 40 receives pulse 108 at logic 40L. And in response, line card 40 transmits a data cell 110 over link 104 to FIFO 64. The transmission of data cell 110 occurs after the transmission of data cell 100 because line card 40 received pulse 108 later in time than when line card 38 received pulse 98. Thus, as graphically depicted in FIG. 2, the transmission of data cells 88, 100, and 110 is staggered. Although the above description uses FIFOs 60, 62, and 64 as the receivers of data cells 88, 100, and 110, it should be understood that in other embodiments, data cells 88, 100, and 110 may be received by ATM switch 70 without going through FIFOs 60, 62, and 64. As stated above, such embodiments allow the elimination of FIFOs 60, 62, and 64, which reduces the cost of manufacturing DSLAMs.

In one embodiment, scheduler 66 schedules the service of FIFOs 60, 62, and 64 in the order that FIFOs 60, 62, and 64 receive their respective data cells. For example, because FIFO 60 received data cell 88 before FIFO 62 and FIFO 64 received their respective data cells 100 and 110, FIFO 60 is scheduled by scheduler 66 to be serviced first by ATM switch 70. Scheduler 66 schedules FIFO 62 to be next in line to be serviced by ATM switch 70 because FIFO 62 received data cell 100 before FIFO 64 received data cell 110. Scheduler 66 schedules FIFO 64 as the last in line to be serviced by ATM switch 70 because FIFO 64 was the last one to receive a data cell, such as data cell 110. This process is repeated when another set of pulses is sent to line cards 36, 38, and 40. In an embodiment where no FIFOs are present, ATM switch 70 may process data cells 88, 100, and 110 as they are received by ATM switch 70. However, in such an embodiment, the data cell processing speed of ATM switch 70 is fast enough where temporary storage of data cells 88, 100, and 110 is not required.

Staggering the data cell transmission from line cards to FIFOs by time intervals that allow scheduler 66 to schedule the service for each FIFO reduces the probability of FIFO overflow. Furthermore, in some embodiments, the risk of FIFO overflow is reduced because a FIFO that is already storing a data cell does not receive another data cell while waiting for the stored data cell to be processed. With the risk of FIFO overflow significantly lowered, scheduler 66 is not required to have a logic unit that is relatively complex, which reduces the cost of manufacturing DSLAMs. In addition, larger capacity FIFOs are not necessary, which also reduces the cost of manufacturing DSLAMs. In embodiments where ATM switch 70 receives and processes data cells 88, 100, and 110 without FIFOs, staggering of the data cell transmission from line cards to ATM switch 70 allows time for ATM switch 70 to process each data cell upon arrival without incurring data cell overload. In such embodiments, the elimination of FIFOs reduces the cost of manufacturing DSLAMs.

In one embodiment, line cards 36, 38, and 40 may not have data cells to send in response to receiving respective pulses 84, 98, and 108. In such a case, each one of line cards 36, 38, and 40 does not send a data cell and instead waits to receive another pulse. In one embodiment, in response to receiving no data cell after sending a pulse, scheduler 66 may schedule for service a data cell that is already stored in one of FIFOs 60, 62, and 64. In another embodiment, scheduler 66 may send a plurality of pulses to any one of line cards 36, 38, and 40 that has not sent a data cell despite receiving a pulse. Scheduler 66 may send the plurality of pulses in anticipation of a burst of data cells that may be built up in any one of line cards 36, 38, and 40 that has not sent a data cell. In another embodiment, scheduler 66 may react to not receiving no data cell from one of line cards 36, 38, and 40 by sending pulses at the same time to those line cards 36, 38, and 40 that have sent data cells, in anticipation that the one of line cards 36, 38, and 40 that did not send a data cell will not send data cells for a period of time. As described above, scheduler 66 is not limited to sending pulses 84, 98, and 108 that are separated by a fixed or predetermined time interval. Rather, scheduler 66 may be capable of dynamically adjusting the time interval based on the previous actions of line cards 36, 38, and 40. Scheduler's 66 dynamic response to line cards 36, 38, and 40 is advantageous because bandwidth waste is reduced.

As discussed above, in one embodiment, FIFOs 60, 62, and 64 may be eliminated from network interface card 34. Scheduler 66 may time the transmission of pulses 84, 98, and 108 so that ATM switch 70 may process data cells 88, 100, and 110 as they arrive. In one embodiment, ATM switch 70 is operable to completely process a data cell before another data cell arrives. Processing data cells 88, 100, and 110 as they arrive eliminates the need for temporary data cell storage. As such, FIFOs 60, 62, and 64 may not be needed. This is advantageous because the elimination of FIFOs 60, 62, and 64 reduces the cost of manufacturing network interface card 34 and saves circuit board space on network interface card 34.

Figure 3A:
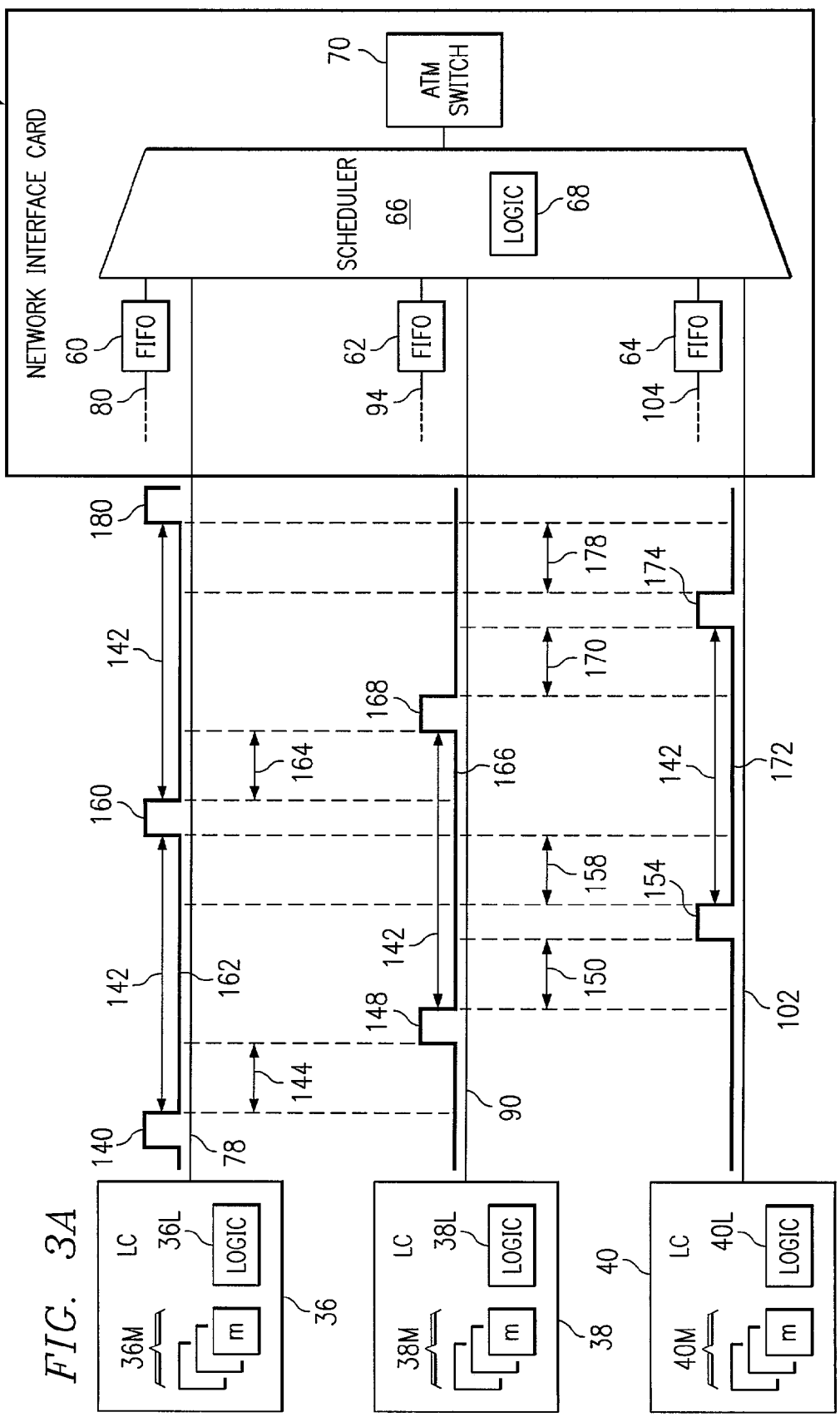
FIG. 3A is a block diagram illustrating additional details of an embodiment of signaling the line cards shown in FIG. 2.
Figure 3B:
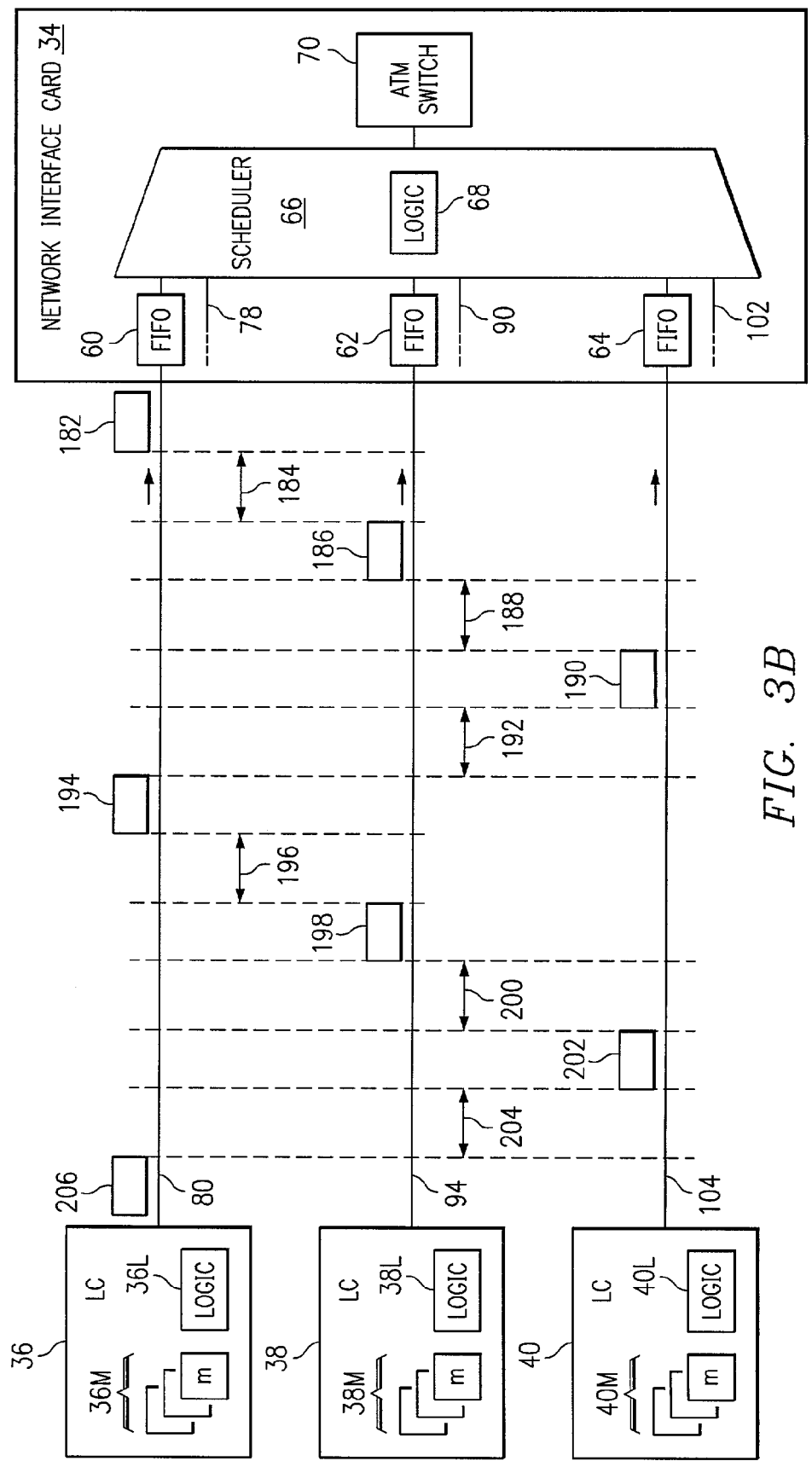
FIG. 3B is a block diagram illustrating additional details of an embodiment of receiving data cells at the network interface card shown in FIG. 2.

FIG. 3A is a block diagram illustrating additional details of an embodiment of signaling line cards 36, 38, and 40 of DSLAM 30 shown in FIG. 2. FIG. 3B is a block diagram illustrating additional details of an embodiment of receiving data cells at network interface card 34 in response to the signaling shown in FIG. 3A. Only the relevant features and features not introduced in conjunction with FIG. 2 are described here.

Referring now to FIG. 3A, in one embodiment, scheduler 66 sends a pulse 140 over link 78 to line card 36. After a time gap 144, scheduler 66 sends a pulse 148 over link 90 to line card 38. After a time gap 150, scheduler 66 sends a pulse 154 to line card 40 over link 102. Then, scheduler 66 sends a pulse 160 over link 78 to line card 36 after a time gap 158. After a time gap 164, scheduler 66 sends a pulse 168 over link 90 to line card 38. After a time gap 170, scheduler 66 sends a pulse 174 to line card 40 over link 102. After a time gap 178, scheduler 66 sends a pulse 180 to line card 36 over link 78. Sets of staggered pulses, such as pulses 140, 148 and 154, may be sent repeatedly by scheduler 66 to line cards 36, 38, and 40 so that data cells may be received in an order that mirrors the staggered transmission of pulses.

In another embodiment, strings 162, 166, and 172 of signals (referred to herein as pulse strings 162, 166, and 172) are transmitted by scheduler 66 to signal line cards 36, 38, and 40 respectively. In one embodiment, pulse string 162 comprises pulses 140, 160, 180, and other subsequent pulses sent by scheduler 66 over link 78. An interval 142 separates each pulse of pulse string 162. Interval 142 is a time separation between pulses. Pulse string 166 comprises pulses 148, 168, and other subsequent pulses sent by scheduler 66 over link 90. Interval 142 separates each pulse of pulse string 166. Pulse string 172 comprises pulses 154, 174, and other subsequent pulses sent by scheduler 66 over link 102. Interval 142 separates each pulse of pulse string 172. In one embodiment, in signaling line cards 36, 38, and 40 using pulse strings 162, 166, and 172 respectively, scheduler 66 shifts each one of pulse strings 162, 166, and 172 by a time gap, such as time gap 144, so that no one pulse of one pulse string directly overlaps another pulse of another pulse string. One example of such shifting is graphically illustrated in FIG. 3A using pulse strings 162, 166, and 172. Therefore, line cards 36, 38, and 40 receive their respective pulses at consistently staggered intervals, ultimately resulting in consistently staggered receipt of data cells by FIFOs 60, 62, and 64.

The staggered arrival of data cells at network interface card 34 in response to the staggered transmission of pulses 140, 148, 154, 160, 168, 174, and 180 is illustrated in detail in FIG. 3B. In response to receiving pulse 140, line card 36 transmits a data cell 182 over link 80 to FIFO 60. After a time gap 184, which may be similar in duration to time gap 144, line card 38 transmits a data cell 186 over link 94 to FIFO 62 in response to receiving pulse 148. After a time gap 188, which may be similar in duration to time gap 150, line card 40 transmits a data cell 190 in response to receiving pulse 154. After a time gap 192, which may be similar in duration to time gap 158, line card 36 transmits a data cell 194 over link 80 to FIFO 60 in response to receiving pulse 160. After a time gap 196, which may be similar in duration to time gap 164, line card 38 transmits a data cell 198 over link 94 to FIFO 62 in response to receiving pulse 168. After a time gap 200, which may be similar in duration to time gap 170, line card 40 transmits a data cell 202 over link 104 to FIFO 64 in response to receiving pulse 174. After a time gap 204, which may be similar in duration to time gap 178, line card 36 transmits a data cell 206 to FIFO 60 over link 80 in response to receiving pulse 180.

As described above, line cards 36, 38, and 40 do not send data cells if line cards 36, 38, and 40 do not have data cells that may be sent. For example, line card 36 may not be able to send data cell 186 if line card 36 did not have data cell 186 to send when pulse 148 is received. Furthermore, although some embodiments illustrated in FIG. 3B includes FIFOs 60, 62, and 64, it should be understood that in other embodiments of the invention, ATM switch 70 may receive all data cells without FIFOs 60, 62, and 64.

As illustrated in FIGS. 3A and 3B, staggering the transmission of pulses, individually or as strings, to each of line cards 36, 38, and 40 results in similar staggering of transmission of data cells from line cards 36, 38, and 40. In one embodiment, interval 142 of pulse strings 162, 166, and 172 may be determined using the number of line cards in DSLAM 30 and the amount of time required to service one FIFO. For example, in one embodiment, the amount of time required to service one FIFO may be multiplied by the number of line cards to determine an interval 142. Such interval 142 allows enough time for scheduler 66 to service, one at a time, the FIFOs associated with the line cards without FIFO overflow. In another embodiment, scheduler 66 may dynamically adjust each interval between pulses of a pulse string based on a pattern of data cell arrival. For example, if no data cell has been sent from line card 36 for a period of time, scheduler 66 may lengthen interval 142 of pulse string 162 and shorten interval 142 of pulse strings 166 and 172. In another example, if line card 36 has a higher bandwidth than those of line cards 38 and 40, then scheduler 66 may shorten interval 142 of pulse string 162 and lengthen interval 142 of pulse strings 166 and 172. However, other criteria may be used to determine the duration of interval 142, as well known by one skilled in the art. Although all of pulse strings 162, 166, and 172 are shown as having interval 142, each one of pulse strings 162, 166, and 172 may use intervals having different duration than that of each other of pulse strings 162, 166, and 172. Additionally, the time gap used to shift pulse strings 162, 166, and 172 may be of varying duration. Furthermore, each time gap used to shift each one of pulse strings 162, 166, and 172 may vary in duration, depending on the particular characteristics of system 10 as decided by one skilled in the art.

In one embodiment, time gaps 144, 150, 158, 164, 170, and 178, as shown in FIG. 3A, may be of equal duration. In another embodiment, the duration of time gaps 144, 150, 158, 164, 170, and 178 may be determined by using the time period required to service one FIFO. In another embodiment, scheduler 66 may send a pulse to one of line cards 36, 38, and 40 only after a particular event, such as completing the service to one FIFO. This embodiment allows scheduler 66 to react to unforeseen delays in data cell servicing and adjust the time gap accordingly. In such an embodiment, time gaps 144, 150, 158, 164, 170, and 178 may vary in duration. In another embodiment, scheduler 66 may dynamically adjust each one of time gaps 144, 150, 158, 164, 170, and 178 based on a pattern of data cell arrival. For example, if no data cell has been sent from line card 36 for a period of time, scheduler 66 may shorten time gaps 144, 150, 164, and 170 so that the available data cell processing capability of network interface card 34 is not wasted. In any case, the particular duration of time gaps 144, 150, 158, 164, 170, and 178 is of minor relevance, as long as the time gaps allow enough time for scheduler 66 to schedule services for all of the FIFO without a FIFO overflow.

In another embodiment, a device other than scheduler 66 may direct line cards 36, 38, and 40 to transmit data cells. For example, a controller (not explicitly shown) may direct line cards 36, 38, and 40 to transmit data cells in accordance with a pre-programmed staggered pattern of data cell transmission. In such an embodiment, the transmission of signals from network interface card 34 to line cards 36, 38, and 40 is unnecessary.

FIG. 4A is a flow chart illustrating method 220 of processing data cells. In one embodiment, method 220 may be implemented using DSLAM 30 shown in FIGS. 2, 3A, or 3B. Method 220 starts at step 224. At step 228, network interface card 34 signals a line card, such as line card 36, to send a data cell. At step 229, the line card determines whether there is a data cell to send to network interface card 34. In one embodiment, if the line card does not have a data cell to send, the line card does not transmit the data cell and waits for the next signal at step 232. In one embodiment, in response to receiving no data cell, network interface card 34 may process a data cell that is stored in a local buffer, such as FIFO 60, at step 238. However, as described above, network interface card 34 may take other measures in response to receiving no data cell. If there is a data cell to send, then at step 230, the line card, such as line card 36, sends a data cell to network interface card 34 in response to receiving the signal from network interface card 34. At step 234, network interface card 34 receives the transmitted data cell. In one embodiment, the transmitted data cell is received at a buffer, such as FIFO 60. After receiving the transmitted data cell, network interface card 34 processes the received data cell at step 238. Method 220 stops at step 240.

FIG. 4B illustrates a repeated implementation of method 220 shown in FIG. 4A. The illustration of method 220 in FIG. 4B omits steps 229 and 232 for convenience. At a first iteration 250, which may be directed to line card 36, method 220 is performed within a time period 254. A second iteration 260, which may be directed to line card 38, starts at the end of time period 254. Second iteration 260 is a repetition of steps 228 through 238 of method 220. Second iteration 260 is performed within a time period 264. A third iteration 270, which may be directed to line card 40, starts at the end of time period 264. Third iteration 270 is a repetition of steps 228 through 238 of method 220. Third iteration 270 is performed within a time period 274. In any one of iterations 250, 260, and 270, steps 230 and 234 may be substituted with steps 232 if line cards do not have data cells to send, as described above in conjunction with method 220 shown in FIG. 4A. Although time periods 254, 264, and 274 are shown in FIG. 4B as the time period required to perform one complete iteration of method 220, time periods 254, 264, and 274 may be of shorter or longer duration. For example, time period 254 may be shortened so that step 234 of first iteration 250 coincides with step 228 of second iteration 260. In another example, time periods 254, 264, and 274 may be of such duration that no step of any iteration of method 220 is performed contemporaneously with another step. In another embodiment, time periods 254, 264, and 274 may be of equal or different time intervals. In another embodiment, time periods 254, 264, and 274 may be of substantially equal duration as that of a time gap, such as time gap 144 shown in FIG. 3A. As illustrated in FIG. 4B, a set of first iteration 250, second iteration 260, and third iteration 270 of method 220 may be repeated indefinitely for line cards 36, 38, and 40 respectively.

Directing the transmission of data cells to network interface card 34 allows network interface card 34 to control the pace in which the data cells are received. Such control allows network interface card 34 to avoid FIFO overflow. Therefore, the use of more complicated schedulers or larger FIFOs is avoided, which decreases the cost of manufacturing DSLAMs. The cost may also be reduced by the elimination of FIFOs, according to some embodiments of the inventions.

Methods and systems described in detail above offer a solution to increased cost involved in lowering the possibility of FIFO overflow. One benefit from some embodiments of the invention is that overflow of FIFOs may be avoided without using larger FIFOs. Another benefit from some embodiments of the invention is that overflow of FIFOs may be avoided without using a complex logic unit in a scheduler that is operable to rapidly schedule multiple FIFOs for service to accommodate random arrival of cells at a network interface unit.

Although the present invention has been described in detail, it should be understood that various changes, substitutions, alterations can be made hereto without departing from the spirit and scope of the invention as defined by the appended claims.

What is claimed is:

1. A method for managing cells in a digital subscriber line access multiplexer comprising:
   providing a plurality of buffers, each one of the plurality of buffers operable to communicate with a respective particular one of a plurality of line cards;
   providing a timing signal controller, the timing signal controller operable to transmit one or more signals to each one of the plurality of line cards, wherein each one of the one or more signals is a command to send a data cell;

transmitting a set of the signals to the plurality of line cards, each signal of the set directed to a unique one of the plurality of line cards and staggered from each other signal of the set by a respective time interval; and in response to transmitting the set of signals, receiving, at the each one of the plurality of buffers, the data cell from the respective particular one of the plurality of line cards that is associated with the each one of the plurality of buffers.

2. The method of claim 1, and further comprising:
providing the plurality of line cards, wherein the each one of the plurality of line cards is operable to send the data cell; and in response to receiving the set of signals, sending the data cell from the each one of the plurality of line cards to the respective each one of the plurality of the buffers that is associated with the each one of the plurality of line cards.

3. The method of claim 1, and further comprising initiating servicing the plurality of the buffers in the order in which the each one of the plurality of buffers receives the respective data cell, wherein servicing comprises processing the data cell for transmission to an Internet Protocol network.

4. The method of claim 1, and further comprising:
after receiving the data cell at the each one of the plurality of buffers, servicing, one of the plurality of buffers at a time, the each one of the plurailty of buffers, wherein servicing comprises processing the data cell for transmission to an Internet Protocol network.

5. The method of claim 1, wherein the data cell is an Asynchronous Transfer Mode cell.

6. The method of claim 1, wherein the time interval is determined using a time period required to process an Asynchronous Transfer Mode cell for transmission to an Internet Protocol network.

7. The method of claim 1, wherein the respective time intervals of each signal of the set are equal.

8. The method of claim 1, wherein the respective time intervals of each signal of the set are predetermined.

9. The method of claim 1, wherein the signal is a pulse.

10. The method of claim 1, wherein the signal is a pulse string having a plurality of pulses, each one of the plurality of pulses separated by another one of the plurality of pulses by a respective time gap.

11. The method of claim 1, and further comprising repeating the steps of transmitting the set of the signals and receiving the data cell at the each one of the plurality of the buffers in response to transmitting the set of the signals.

12. The method of claim 1, wherein the timing signal controller is a scheduler.

13. A method for managing cells in a digital subscriber line access multiplexer comprising:
providing a plurality of line cards, each one of the plurality of the line cards operable to receive a timing signal indicating request for a data cell from a network interface card and in response, send the data cell to the network interface card;

for each line card, transmitting a timing signal directing a respective line card to transmit the data cell to the network interface card, the timing signal offset in time a time interval from a previous timing signal associated with a particular one of the other of the plurality of line cards.

14. The method of claim 13, and further comprising:
from each line card, transmitting the data cell in response to receiving the respective timing signal; and in response to transmitting the timing signal, receiving, at the network interface card, the data cell from the respective one of the plurality of line cards.

15. The method of claim 13, and further comprising processing, using an Asynchronous Transfer Mode switch of the network interface card, the data cell received by the network interface card for transmission to an Internet Protocol network.

16. The method of claim 13, wherein the data cell is an Asynchronous Transfer Mode cell.

17. The method of claim 13, wherein the time interval is determined using a time period required to process an Asynchronous Transfer Mode cell for transmission to an Internet Protocol network.

18. The method of claim 13, and further comprising adjusting the time interval according to receiving no data cell at the network interface card.

19. The method of claim 13, wherein the respective time interval of the timing signal and the previous timing signal are equal in duration.

20. The method of claim 13, wherein the timing signal is a pulse.

21. The method of claim 13, wherein the timing signal is a pulse string, the pulse string having a plurality of pulses, each one of the plurality of pulses separated by another one of the plurality of pulses by a time gap.

22. The method of claim 13, and further comprising repeating the step of transmitting the timing signal and, in response to each repetition of the step of transmitting the timing signal, receiving the data cell at the network interface card.

23. The method of claim 13, and further comprising:
providing a respective associated buffer in the network interface card for each line card; and receiving, at the respective associated buffer, the data cell from the respective one of the plurality of line cards.

24. The method of claim 13, and further comprising:
providing a respective associated buffer in the network interface card for each line card, the respective associated buffer having a stored data cell;

receiving no data cell after transmitting a timing signal; and in response to receiving no data cell, processing the stored data cell.

25. The method of claim 13, and further comprising adjusting the time interval based on whether the data cell is received.

26. A system for managing data in a digital subscriber line access multiplexer comprising:
a plurality of buffers, each one of the plurality of the buffers operable to receive a data cell from a respective associated line card associated with the each one of the plurality of the buffers; and a timing signal controller coupled to a plurality of the respective associated line cards associated with each one of the plurality of the buffers, the timing signal controller operable to transmit a set of signals to the plurality of the respective associated line cards, each signal of the set directed to a unique one of the plurality of the respective associated line cards and staggered from each other signal of the set by a respective time interval, wherein each one of the signals in the set is a request for the data cell.

27. The system of claim 26, and further comprising a respective associated line card associated with the each one of the plurality of the buffers, wherein the respective associated line card is operable to send the data cell in response to receiving one of the signals in the set.

28. The system of claim 26, wherein the timing signal controller is further operable to initiate servicing the plurality of the buffers in the order in which the each one of the plurality of buffers receives the respective data cell, wherein servicing comprises processing the data cell for transmission to an Internet Protocol network.

29. The system of claim 26, wherein the timing signal controller is further operable to service, one of the plurality of the buffers at a time, each one of the plurality of buffers, wherein servicing comprises processing the data cell for transmission to an Internet Protocol network.

30. The system of claim 26, wherein the data cell is an Asynchronous Transfer Mode cell.

31. The system of claim 26, wherein the time interval is determined using a time period required to process an Asynchronous Transfer Mode cell for transmission to an Internet Protocol network.

32. The system of claim 26, wherein the respective time intervals of each signal of the set are equal in duration.

33. The system of claim 26, wherein the respective time interval of each signal of the set are predetermined.

34. The system of claim 26, wherein the signal is a pulse.

35. The system of claim 26, wherein the signal is a pulse string having a plurality of pulses, each one of the plurality of pulses separated by another one of the plurality of pulses by a respective time gap.

36. The system of claim 26, wherein the timing signal controller is further operable to repeatedly transmit the set of signals.

37. The system of claim 26, wherein the timing signal controller is a scheduler.

38. A system for managing data in a digital subscriber line access multiplexer comprising:
 a network interface card;
 a plurality of line cards, each one of the plurality of line cards operable to receive a timing signal indicating a request for a data cell from the network interface card and in response, send the data cell to the network interface card, wherein, for each line card, the network interface card is operable to transmit the timing signal directing the each line card to transmit the data cell to the network interface card, the timing signal offset in time a respective time interval from a previous timing signal associated with a particular one of the other of the plurality of line cards.

39. The system of claim 38, wherein the network interface card is further operable to initiate processing, in the order in which the data cell is received, for transmission to an Internet Protocol network.

40. The system of claim 38, wherein the network interface card is further operable to process, using an Asynchronous Transfer Mode switch of the network interface card, the data cell received by the network interface card for transmission to an Internet Protocol network.

41. The system of claim 38, wherein the data cell is an Asynchronous Transfer Mode cell.

42. The system of claim 38, wherein the time interval is determined using a time period required to process an Asynchronous Transfer Mode cell for transmission to an Internet Protocol network.

43. The system of claim 38, wherein the respective time interval of the timing signal and the previous timing signal are equal in duration.

44. The system of claim 38, wherein the timing signal is a pulse.

45. The system of claim 38, wherein the timing signal is a pulse string, the pulse string having a plurality of pulses, each one of the plurality of pulses separated by another one of the plurality of pulses by a respective time gap.

46. The system of claim 38, wherein the network interface card is operable to repeatedly transmit the timing signal and, in response to each transmission of the timing signal, receive the data cell at the network interface card.

47. The system of claim 38, and further comprising a respective associated buffer in the network interface card for each line card, wherein the each line card is operable to send the data cell to the respective associated buffer in response to receiving the timing signal.

48. The system of claim 38, and further comprising:
 a buffer coupled to the network interface card, the buffer having a stored data cell, wherein the network interface card is further operable to process the stored data cell in response to receiving no data cell from any one of the plurality of line cards.

49. The system of claim 38, wherein the network interface card is further operable to adjust the time interval according to receiving no data cell at the network interface card.

50. A system for managing cells in a digital subscriber line access multiplexer comprising:
 a plurality of transmitting means operable to receive a timing signal indicating a request for a data cell from a network interface card and in response, transmit the data cell to the network interface card;
 means for sending the timing signal directing a respective transmitting means to transmit the data cell to the network interface card, the timing signal offset in time a time interval from a previous timing signal associated with a particular one of the other of the plurality of transmitting means.

* * * * *